US011922874B2

(12) United States Patent
Yuan et al.

(10) Patent No.: US 11,922,874 B2
(45) Date of Patent: Mar. 5, 2024

(54) DISPLAY CONTROL METHOD AND DEVICE

(71) Applicants: Hefei BOE Joint Technology Co., Ltd., Anhui (CN); BOE Technology Group Co., Ltd., Beijing (CN)

(72) Inventors: Zhidong Yuan, Beijing (CN); Can Yuan, Beijing (CN); Yongqian Li, Beijing (CN); Lang Liu, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/788,627

(22) PCT Filed: Sep. 13, 2021

(86) PCT No.: PCT/CN2021/117994
§ 371 (c)(1),
(2) Date: Jun. 23, 2022

(87) PCT Pub. No.: WO2022/089047
PCT Pub. Date: May 5, 2022

(65) Prior Publication Data

US 2023/0252943 A1 Aug. 10, 2023

(30) Foreign Application Priority Data

Oct. 30, 2020 (CN) ......................... 202011194016.2

(51) Int. Cl.
*G09G 3/3233* (2016.01)
*G09G 3/3283* (2016.01)

(52) U.S. Cl.
CPC ......... *G09G 3/3233* (2013.01); *G09G 3/3283* (2013.01); *G09G 2300/0426* (2013.01); *G09G 2310/08* (2013.01); *G09G 2320/0247* (2013.01)

(58) Field of Classification Search
CPC ............... G09G 3/3233; G09G 3/3283; G09G 2300/0426; G09G 2310/08; G09G 2320/0247
See application file for complete search history.

(56) References Cited

U.S. PATENT DOCUMENTS

2009/0079679 A1 3/2009 Nam
2014/0085279 A1* 3/2014 Shiomi ................ G09G 3/3666 345/204

(Continued)

FOREIGN PATENT DOCUMENTS

CN 101393721 A 3/2009
CN 102222468 A 10/2011

(Continued)

OTHER PUBLICATIONS

CN 202011194016.2 first office action.
PCT/CN2021/117994 international search report and written opinion.

*Primary Examiner* — Kevin M Nguyen
(74) *Attorney, Agent, or Firm* — IPro, PLLC

(57) ABSTRACT

The present disclosure provides a display control method and a display control device. The display control method is used for a display panel. The display panel includes at least a first display area and a second display area arranged in a first direction, the first display area is coupled to a first signal line, and the second display area is coupled to a second signal line. The display control method includes: controlling a first sub-pixel in the first display area to display an image via the first signal line; and controlling a second sub-pixel in the second display area to display an image via the second signal line. A light-emission phase of the first sub-pixel at most partially overlaps a light-emission phase of the second sub-pixel.

14 Claims, 2 Drawing Sheets

(56) References Cited

U.S. PATENT DOCUMENTS

| | | | | |
|---|---|---|---|---|
| 2014/0168195 | A1 | 6/2014 | Kumeta et al. | |
| 2016/0210906 | A1* | 7/2016 | In | G09G 3/3233 |
| 2018/0357963 | A1 | 12/2018 | Gai et al. | |
| 2019/0005877 | A1 | 1/2019 | Dong | |
| 2019/0180677 | A1* | 6/2019 | Hwang | G09G 3/3208 |
| 2019/0311683 | A1* | 10/2019 | Park | G09G 3/3266 |
| 2020/0020271 | A1 | 1/2020 | Watsuda | |
| 2021/0082338 | A1 | 3/2021 | Xi et al. | |
| 2021/0280153 | A1 | 9/2021 | Chaji et al. | |

FOREIGN PATENT DOCUMENTS

| | | | |
|---|---|---|---|
| CN | 102930824 | A | 2/2013 |
| CN | 105845081 | A | 8/2016 |
| CN | 106898307 | A | 6/2017 |
| CN | 108877669 | A | 11/2018 |
| CN | 110718182 | A | 1/2020 |
| CN | 111402794 | A | 7/2020 |
| CN | 112259049 | A | 1/2021 |

* cited by examiner

DISPLAY CONTROL METHOD AND DEVICE

CROSS-REFERENCE TO RELATED APPLICATIONS

This application is the U.S. national phase of PCT Application No. PCT/CN2021/117994 filed on Sep. 13, 2021, which claims a priority of the Chinese Patent Application No. 202011194016.2 filed on Oct. 30, 2020, which is incorporated herein by reference in its entirety.

TECHNICAL FIELD

The present disclosure relates to the field of display technology, in particular to a display control method and a display control device.

BACKGROUND

With the development of the display technology, an Organic Light-Emitting Diode (OLED) display panel has attracted more and more attentions due to such advantages as rapid response and high image quality. However, in the existing OLED display panel, a light emission time of each pixel is constant. When the light emission time is too short, such a phenomenon as flicker may occur for the display panel, and thereby a display effect may be adversely affected.

SUMMARY

An object of the present disclosure is to provide a display control method and a display control device, so as to prevent the occurrence of flicker for the display panel due to a short light emission time, thereby to improve the display effect.

In one aspect, the present disclosure provides in a possible embodiment of the present disclosure a display control method for a display panel. The display panel includes at least a first display area and a second display area arranged in a first direction, the first display area is coupled to a first signal line, and the second display area is coupled to a second signal line. The display control method includes: controlling a first sub-pixel in the first display area to display an image via the first signal line; and controlling a second sub-pixel in the second display area to display an image via the second signal line. A light-emission phase of the first sub-pixel at most partially overlaps a light-emission phase of the second sub-pixel.

In a possible embodiment of the present disclosure, the first signal line includes a first light-emission control signal line for providing a first light-emission control signal, the second signal line includes a second light-emission control signal line for providing a second light-emission control signal different from the first light-emission control signal, and the first display area and the second display area are coupled to a same gate driving signal line.

In a possible embodiment of the present disclosure, a falling edge of the second light-emission control signal is between a falling edge of the first light-emission control signal and a rising edge of the first light-emission control signal.

In a possible embodiment of the present disclosure, each light-emission period of the first sub-pixel includes a first resetting phase, a first compensation phase, a first data writing phase and a first light-emission phase in sequence, each light-emission period of the second sub-pixel includes a second resetting phase, a second compensation phase, a second data writing phase and a second light-emission phase in sequence, and the second resetting phase and the second compensation phase correspond to the first data writing phase.

In a possible embodiment of the present disclosure, the first data writing phase overlaps the second data writing phase by a time length not more than one third of the second data writing phase.

In another aspect, the present disclosure provides in some embodiments a display control device for a display panel. The display panel includes at least a first display area and a second display area arranged in a first direction, the first display area is coupled to a first signal line, and the second display area is coupled to a second signal line. The display control device includes: a first control module configured to control a first sub-pixel in the first display area to display an image via the first signal line; and a second control module configured to control a second sub-pixel in the second display area to display an image via the second signal line. A light-emission phase of the first sub-pixel at most partially overlaps a light-emission phase of the second sub-pixel.

In a possible embodiment of the present disclosure, the first signal line includes a first light-emission control signal line for providing a first light-emission control signal, the second signal line includes a second light-emission control signal line for providing a second light-emission control signal different from the first light-emission control signal, and the first display area and the second display area are coupled to a same gate driving signal line.

In a possible embodiment of the present disclosure, a falling edge of the second light-emission control signal is between a falling edge of the first light-emission control signal and a rising edge of the first light-emission control signal.

In a possible embodiment of the present disclosure, each light-emission period of the first sub-pixel includes a first resetting phase, a first compensation phase, a first data writing phase and a first light-emission phase in sequence, each light-emission period of the second sub-pixel includes a second resetting phase, a second compensation phase, a second data writing phase and a second light-emission phase in sequence, and the second resetting phase and the second compensation phase correspond to the first data writing phase.

In a possible embodiment of the present disclosure, the first data writing phase overlaps the second data writing phase by a time length not more than one third of the second data writing phase.

According to the embodiments of the present disclosure, the light-emission phase of the first sub-pixel in the first display area at most partially overlaps the light-emission phase of the second sub-pixel in the second display area. As a result, it is able to prolong a light emission time of the display panel within each light-emission period, thereby to prevent the occurrence of flicker due to a short light emission time and improve the display effect.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
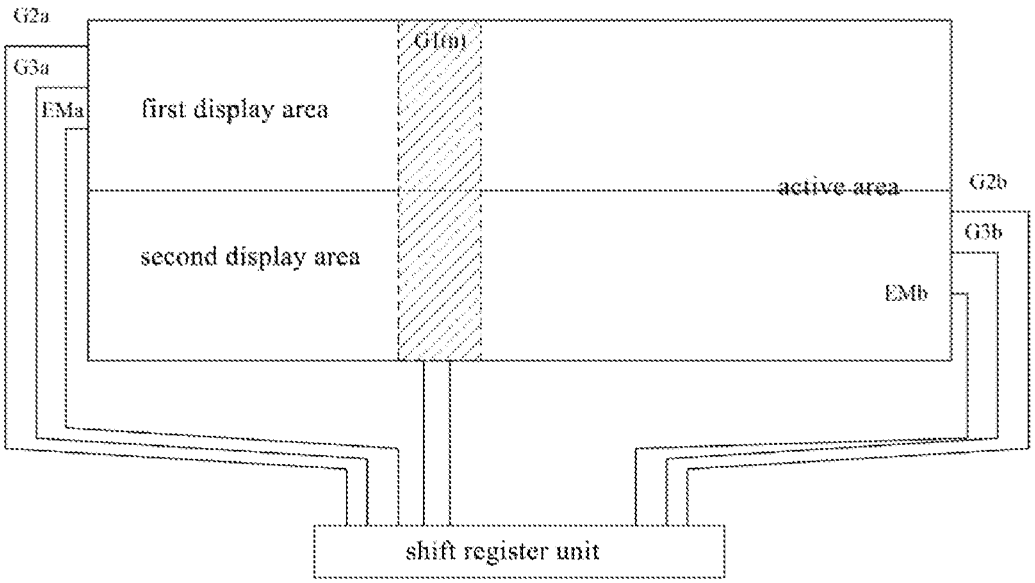
FIG. 1 is a schematic view showing a display panel according to one embodiment of the present disclosure.

The present disclosure provides in some embodiments a display control method for a display panel. As shown in FIG. 1, the display panel includes at least a first display area and a second display area arranged in a first direction.

In the embodiments of the present disclosure, an active area (AA) of the display panel is divided into a plurality of display areas, e.g., at least two display areas. Of course, in actual use, the quantity of the display areas may be three, four, five or more.

When the display areas include the first display area and the second display area, the first display area is coupled to a first signal line, and the second display area is coupled to a second signal line so as to obtain corresponding control signals. When there are more display areas, each display area is coupled to a set of signal lines so as to obtain a control signal, or several display areas are coupled to a same set of signal lines so as to obtain a control signal. There are at least two sets of signal lines.

Illustratively, the display areas include two display areas, i.e., the first display area and the second display area, the first display area is coupled to the first signal line and the second display area is coupled to the second signal line.

Each display area includes a plurality of sub-pixels. In the embodiments of the present disclosure, the first display area includes first sub-pixels, and the second display area includes second sub-pixels.

A structure of the sub-pixel may be set according to the practical need. Illustratively, in the embodiments of the present disclosure, the sub-pixel is a 5T1C sub-pixel including five control switch transistors and one storage capacitor. Of course, in actual use, the structure of the sub-pixel is not limited thereto.

Figure 2:
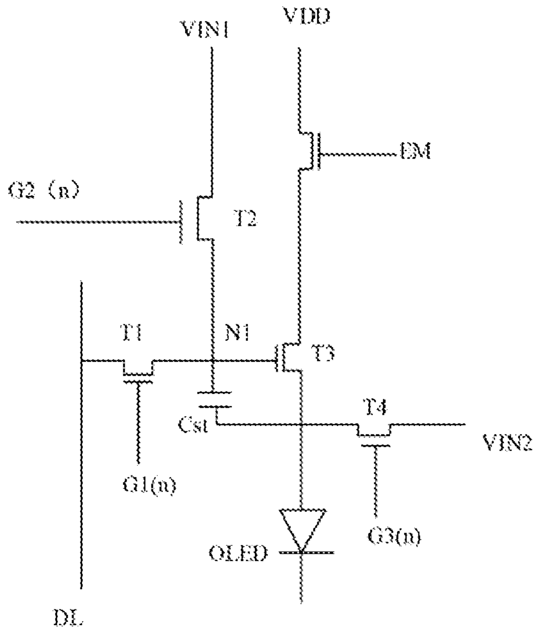
FIG. 2 is a circuit diagram of a pixel structure according to one embodiment of the present disclosure.

As shown in FIG. 2, in the embodiments of the present disclosure, each sub-pixel includes a first transistor T1, a second transistor T2, a third transistor T3, a fourth transistor T4, a fifth transistor T5 and a storage capacitor Cst. Each transistor includes a gate electrode, a first electrode and a second electrode. The gate electrode is also called a control electrode, the first electrode may be a source electrode and the second electrode may be a drain electrode, or the first electrode may be a drain electrode and the second electrode may be a source electrode.

The gate electrode of the first transistor T1 is coupled to a gate driving signal line G1(*n*), the first electrode of the first transistor T1 is coupled to a data line DL, and the second electrode of the first transistor T1 is coupled to a first node N1.

The gate electrode of the second transistor T2 is coupled to a first control signal line G2(*n*), the first electrode of the second transistor T2 is coupled to a first power source signal line VIN1, and the second electrode of the second transistor T2 is coupled to the first node N1.

The gate electrode of the third transistor T3 is coupled to the first node N1, the first electrode of the third transistor T3 is coupled to an anode of a light-emitting diode OLED, and the second electrode of the third transistor T3 is coupled to the second electrode of the fifth transistor T5.

The gate electrode of the fourth transistor T4 is coupled to a second control signal line G3(*n*), the first electrode of the fourth transistor T4 is coupled to the first power source signal line VIN2, and the second electrode of the third transistor T3 is coupled to the anode of the light-emitting diode.

The gate electrode of the fifth transistor T5 is coupled to a light emission control signal line EM(n), and the first electrode of the fifth transistor T5 is coupled to a power source line VDD.

A first electrode of the storage capacitor Cst is coupled to the first node, and a second electrode of the storage capacitor Cst is coupled to the anode of the light-emitting diode OLED.

A set of signal lines corresponding to each display area include the gate driving signal line G1(*n*), the first control signal line G2(*n*), the second control signal line G3(*n*), and the light emission control signal line EM(n).

In the embodiments of the present disclosure, the first signal lines corresponding to the first display area are denoted as G1*a*(n), G2*a*(n), G3*a*(n) and EMa respectively, and the second signal lines corresponding to the second display area are denoted as G1*b*(n), G2*b*(n), G3*b*(n) and EMb respectively.

In some embodiments of the present disclosure, the first signal line includes a first light-emission control signal line EMa for providing a first light-emission control signal, the second signal line includes a second light-emission control signal line EMb for providing a second light-emission control signal different from the first light-emission control signal, and the first display area and the second display area are coupled to a same gate driving signal line. That is, G1*a*(n) and G1*b*(n) are the same gate driving signal line, i.e. G1(*n*) in FIG. 1. In this way, it is able to reduce the quantity of lines and save a wiring space, thereby to improve an aperture ratio as well as a resolution of the display panel.

Figure 3:
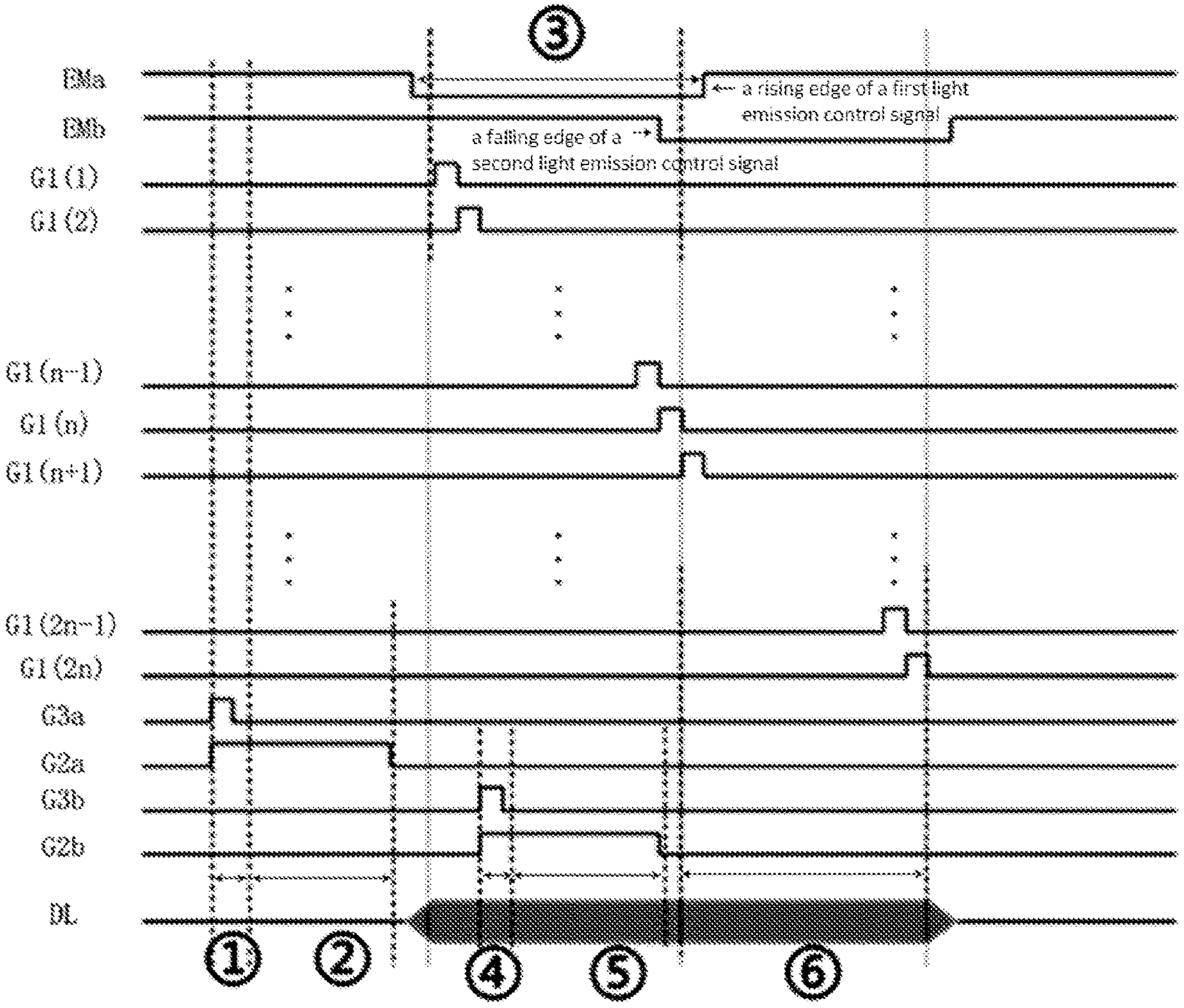
FIG. 3 is a sequence diagram of a display control method according to one embodiment of the present disclosure.

As shown in FIG. 3, each light-emission period of each sub-pixel includes a resetting phase, a compensation phase, a data writing phase and a light-emission phase.

In the resetting phase, the second control signal line G3(*n*) is enabled, so as to turn on the fourth transistor T4, thereby to reset the second electrode of the third transistor T3. The first control signal line G2(*n*) provides a high level signal, and compensation data Vref provided by the first power source signal line VIN1 is written into the first node N1 through the second transistor T2.

In the compensation phase, the second control signal line G3(*n*) is disabled, so as to charge the storage capacitor Cst, and enable a potential at the first electrode of the third transistor T3 to be Vref-Vth, where Vth is a threshold voltage.

In the data writing phase, the light emission control signal line EM(n) provides a low level signal, and the gate driving signal lines G1(*n*) are sequentially enabled, so as to write light emission is sequentially into the sub-pixels in a first row to an $N^{th}$ row.

In the light-emission phase, the light emission control signal line EM(n) provides a high level signal, so as to enable the sub-pixels in the display area to emit light.

In the embodiments of the present disclosure, each light-emission period of the first sub-pixel includes a first resetting phase (phase ① in FIG. 3), a first compensation phase (phase ② in FIG. 3), a first data writing phase (phase ③ in FIG. 3) and a first light-emission phase, and each light-emission period of the second sub-pixel includes a second resetting phase (phase ④ in FIG. 3), a second compensation phase (phase ⑤ in FIG. 3), a second data writing phase (phase ⑥ in FIG. 3) and a second light-emission phase. In FIG. 3, the first light-emission phase is the high level period of EMa, the second light-emission phase is the high level period of EMb.

As shown in FIG. 3, in the embodiments of the present disclosure, first to $n^{th}$ rows correspond to the first display area, and $(n+1)^{th}$ to $(2n)^{th}$ rows correspond to the second display area.

In the embodiments of the present disclosure, the display control method includes: controlling the first sub-pixel in the first display area to display an image via the first signal line; and controlling the second sub-pixel in the second display area to display an image via the second signal line.

In the embodiments of the present disclosure, during the implementation, the first sub-pixel in the first display area is controlled to emit light through the first signal line, and the second sub-pixel in the second display area is controlled to emit light through the second signal line. A specific light emission control process may refer to that mentioned hereinabove.

In the embodiments of the present disclosure, the light-emission phase of the first sub-pixel at most partially overlaps the light-emission phase of the second sub-pixel, i.e. when the first sub-pixel enters the light-emission phase, the second sub-pixel is not in a light-emitting state. In this way, the light-emission phase of the first sub-pixel does not completely overlaps the light-emission phase of the second sub-pixel.

When a duration of each light-emission phase is $t1$, and a duration in which the light-emission phase of the first sub-pixel overlaps the light-emission phase of the second sub-pixel is $t2$, in each light-emission period, the light-emission time of the pixel in the display panel is $2t1-t2$. Because $t2$ is less than $t1$, $2t1-t2$ is greater than $t1$. In this way, it is able to increase the light-emission time of the pixel in the display panel within each light-emission period.

In the embodiments of the present disclosure, the light-emission phase of the first sub-pixel in the first display area at most partially overlaps the light-emission phase of the second sub-pixel in the second display area. In this way, it is able to prolong the light-emission time of the display panel within each light-emission period, thereby to prevent the occurrence of flicker due to a short light-emission time, and improve the display effect.

In some embodiments of the present disclosure, a falling edge of the second light-emission control signal is between a falling edge of the first light-emission control signal and a rising edge of the first light-emission control signal. That is, in the embodiments of the present disclosure, the first data writing phase partially overlaps the second data writing phase.

In some embodiments of the present disclosure, the first data writing phase overlaps the second data writing phase by a time length not more than one third of the second data writing phase. It should be appreciated that, the shorter the time length by which the first data writing phase overlaps the second data writing phase, the shorter the time length by which first light-emission phase overlaps the second light-emission phase. In this way, it is able to prolong a total light-emission time of the display panel within each light-emission period, thereby to improve the display effect.

In a possible embodiment of the present disclosure, the second resetting phase and the second compensation phase correspond to the first data writing phase. That is, when the first display area is in the first data writing phase, the second display area is in the second resetting phase and the second compensation phase. In this way, it is able to increase the light-emission time of the display panel, thereby to improve the display effect of the display panel.

The present disclosure further provides in some embodiments a display control device for a display panel. The display panel includes at least a first display area and a second display area arranged in a first direction, the first display area is coupled to a first signal line, and the second display area is coupled to a second signal line. The display control device includes: a first control module configured to control a first sub-pixel in the first display area to display an image via the first signal line; and a second control module configured to control a second sub-pixel in the second display area to display an image via the second signal line. A light-emission phase of the first sub-pixel at most partially overlaps a light-emission phase of the second sub-pixel.

In some embodiments of the present disclosure, the first signal line includes a first light-emission control signal line for providing a first light-emission control signal, the second signal line includes a second light-emission control signal line for providing a second light-emission control signal different from the first light-emission control signal, and the first display area and the second display area are coupled to a same gate driving signal line.

In some embodiments of the present disclosure, a falling edge of the second light-emission control signal is between a falling edge of the first light-emission control signal and a rising edge of the first light-emission control signal.

In some embodiments of the present disclosure, each light-emission period of the first sub-pixel includes a first resetting phase, a first compensation phase, a first data writing phase and a first light-emission phase in sequence, each light-emission period of the second sub-pixel includes a second resetting phase, a second compensation phase, a second data writing phase and a second light-emission phase in sequence, and the second resetting phase and the second compensation phase correspond to the first data writing phase.

In some embodiments of the present disclosure, the first data writing phase overlaps the second data writing phase by a time length not more than one third of the second data writing phase.

According to the embodiments of the present disclosure, the light-emission phase of the first sub-pixel in the first display area at most partially overlaps the light-emission phase of the second sub-pixel in the second display area. As a result, it is able to prolong a light emission time of the display panel within each light-emission period, thereby to prevent the occurrence of flicker due to a short light emission time and improve the display effect.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

In the embodiments of that present disclosure, modules, units or subunits may be implemented by software to be executed by various types of processors. For example, an identified executable code module may include one or more physical or logical blocks including computer instructions, which may be constructed as an object, process, or function, for example. However, an executable code of the identified module does not need to be physically located together, but may include different instructions stored in different locations that, in a case that the different instructions are logically combined, the instructions constitute the modules and achieve the specified purpose of the module.

A corresponding hardware circuit may be designed by a person skilled in the art to realize the modules, units or subunits, without considering a cost. The hardware circuit includes a conventional Very Large Scale Integrated (VLSI) circuit or a gate array and a related semiconductor such as a logic chip, a transistor, or other discrete elements. The module may also be implemented by a programmable hardware device, such as a Field Programmable Gate Array, a programmable array logic, a programmable logic device, and the like.

What is claimed is:

1. A display control method for a display panel, the display panel comprising at least a first display area and a second display area arranged in a first direction, the first display area being coupled to a first signal line, the second display area being coupled to a second signal line, the display control method comprising:

controlling a first sub-pixel in the first display area to display an image via the first signal line; and controlling a second sub-pixel in the second display area to display an image via the second signal line, wherein a light-emission phase of the first sub-pixel at most partially overlaps a light-emission phase of the second sub-pixel;

wherein each light-emission period of the first sub-pixel comprises a first resetting phase, a first compensation phase, a first data writing phase and a first light-emission phase in sequence, each light-emission period of the second sub-pixel comprises a second resetting phase, a second compensation phase, a second data writing phase and a second light-emission phase in sequence, and the second resetting phase and the second compensation phase correspond to the first data writing phase;

wherein when the first display area is in the first data writing phase, the second display area is in the second resetting phase and the second compensation phase.

2. The display control method according to claim 1, wherein the first signal line comprises a first light-emission control signal line for providing a first light-emission control signal, the second signal line comprises a second light-emission control signal line for providing a second light-emission control signal different from the first light-emission control signal, and the first display area and the second display area are coupled to a same gate driving signal line.

3. The display control method according to claim 2, wherein a falling edge of the second light-emission control signal is between a falling edge of the first light-emission control signal and a rising edge of the first light-emission control signal.

4. The display control method according to claim 2, wherein the first data writing phase overlaps the second data writing phase by a time length not more than one third of the second data writing phase.

5. The display control method according to claim 1, wherein the first data writing phase overlaps the second data writing phase by a time length not more than one third of the second data writing phase.

6. The display control device according to claim 1, wherein the first data writing phase overlaps the second data writing phase by a time length not more than one third of the second data writing phase.

7. The display control method according to claim 1, wherein when the first sub-pixel enters the light-emission phase, the second sub-pixel is not in a light-emitting state.

8. The display control method according to claim 1, wherein a sum of a time length of the second resetting phase and a time length of the second compensation phase is smaller than or equal to a time length of the first data writing phase.

9. A display control device for a display panel, the display panel comprising at least a first display area and a second display area arranged in a first direction, the first display area being coupled to a first signal line, the second display area being coupled to a second signal line, the display control device comprising:

a first control circuit configured to control a first sub-pixel in the first display area to display an image via the first signal line; and a second control circuit configured to control a second sub-pixel in the second display area to display an image via the second signal line, wherein a light-emission phase of the first sub-pixel at most partially overlaps a light-emission phase of the second sub-pixel;

wherein each light-emission period of the first sub-pixel comprises a first resetting phase, a first compensation phase, a first data writing phase and a first light-emission phase in sequence, each light-emission period of the second sub-pixel comprises a second resetting phase, a second compensation phase, a second data writing phase and a second light-emission phase in sequence, and the second resetting phase and the second compensation phase correspond to the first data writing phase;

wherein when the first display area is in the first data writing phase, the second display area is in the second resetting phase and the second compensation phase.

10. The display control device according to claim 9, wherein the first signal line comprises a first light-emission control signal line for providing a first light-emission control signal, the second signal line comprises a second light-emission control signal line for providing a second light-emission control signal different from the first light-emission control signal, and the first display area and the second display area are coupled to a same gate driving signal line.

11. The display control device according to claim 10, wherein a falling edge of the second light-emission control signal is between a falling edge of the first light-emission control signal and a rising edge of the first light-emission control signal.

12. The display control device according to claim 10, wherein the first data writing phase overlaps the second data writing phase by a time length not more than one third of the second data writing phase.

13. The display control device according to claim 9, wherein when the first sub-pixel enters the light-emission phase, the second sub-pixel is not in a light-emitting state.

14. The display control device according to claim 9, wherein a sum of a time length of the second resetting phase and a time length of the second compensation phase is smaller than or equal to a time length of the first data writing phase.

* * * * *